United States Patent [19]

Yamamoto et al.

[11] Patent Number: 5,188,866
[45] Date of Patent: Feb. 23, 1993

[54] PROCESS OF MAKING A MAGNETIC RECORDING MEDIUM

[75] Inventors: Yuzo Yamamoto, Wakayama; Katsunori Nomoto; Tsutomu Isobe, both of Tochigi, all of Japan

[73] Assignee: Kao Corporation, Tokyo, Japan

[21] Appl. No.: 791,390

[22] Filed: Nov. 14, 1991

Related U.S. Application Data

[62] Division of Ser. No. 292,533, Dec. 30, 1988, Pat. No. 5,080,982.

[30] Foreign Application Priority Data

Jan. 4, 1988 [JP] Japan .................................. 63-199

[51] Int. Cl.$^5$ ............................................. B05D 5/12
[52] U.S. Cl. .................................... 427/132; 427/250; 427/255.2; 427/255.6; 427/443.1
[58] Field of Search ................................ 427/128–132, 427/48, 250, 255.2, 255.6, 443.1; 428/694, 695, 900

Primary Examiner—Bernard Pianalto
Attorney, Agent, or Firm—Birch, Stewart, Kolasch & Birch

[57] ABSTRACT

The magnetic recording medium comprises a substrate, a recording coating of a ferromagnetic metal and an aromatic organic polymer having a weight-average molecular weight of 1,000 to 5,000,000. The magnetic recording medium is produced by a plating method or a vaporization method so as to form co-deposition of the metal and the polymer. The magnetic recording medium produced is improved in resistance to corrosion.

16 Claims, 4 Drawing Sheets

300Å

PROCESS OF MAKING A MAGNETIC RECORDING MEDIUM

This application is a divisional of copending application Ser. No. 07/292,533, filed on Dec. 30, 1988, U.S. Pat. No. 5,080,982, now allowed, the entire contents of which are hereby incorporated by reference.

BACKGROUND OF THE INVENTION

1. Field of the Invention

The present invention relates to a magnetic recording medium such as magnetic tape and a magnetic disk and a process for the preparation thereof. The magnetic recording medium of the present invention is improved in view of its durability and resistance to corrosion in addition to its excellent recording properties.

2. (Prior Art)

In the state of arts, a magnetic recording medium is produced, for example, by a physical method such as evaporation in vacuum and spattering, or a chemical method such as electroless plating, on a substrate of glass or a polymer containing a ferromagnetic metal or an alloy thereof. See for example Japanese patent publication A No. 52-153 407 and 58-3963. It is to be mentioned, however, that the prior medium is characterized with poor durability and resistance to corrosion, although this characterization effectively applies to high density recordings. The prior medium has a large friction against a magnetic head and is easily abrased and scratched. Moreover, it is not flexible and is therefor, instable during operation, in view of its contact with the magnetic head. It is easily corroded in air and as a result its magnetic properties, such as a saturated density of magnetic flux, are reduced. Therefore, The present invention overcomes the above discussed defects, in particular provides an improvement in resistance to corrosion. This is attained by use of a specific organic polymer together with deposition of a ferromagnetic metal. It is preferable that the polymer is contained in the matrix of the metal in the form of their complex.

SUMMARY OF THE INVENTION

The present invention provides a magnetic recording medium which comprises a substrate and a recording layer, coated on the substrate, said recording layer comprising a continuously formed thin film comprising a ferromagnetic metal and 0.001 to 30 percent by weight, based on the film, of an aromatic organic polymer having a weight-average molecular weight of 1,000 to 5,000,000, the polymer being contained in the film.

It is preferable that the recording film layer contains 0.01 to 30 percent by weight of the polymer the polymer having a weight-averaqe molecular weight of 1,000 to 1,000,000. The polymer is preferably soluble or dispersible in water, and may be in the form of a micelle.

It is also preferred that the film contains 0.001 to 10 percent by weight of the polymer, in particular when it is produced by the evaporation method.

It is desirable that the polymer is contained within the crystal grain of the deposited metal.

It is preferable that the polymer contains a metal in its molecule.

The metal contained in the polymer to be deposited on the substrate, is preferably selected from the group consisting of Co, Ni, Ti, Pd, Pt, Zr, Hf, Rh, Fe, V, Cr, Mo and Si.

The polymer preferably has at least one hydroxy group attached to its aromatic ring.

The polymer preferably includes polymers (B), (B') and (A).

Polymer (B) has a weight-average molecular weight of 1,000 to 5,000,000 and comprises at least one aromatic ring and 1 to 10 OH groups on the average, based on 500 units of the molecular weight and further, as an indispensable component, zero to 4 sulfone groups ($-SO_3$) or zero to 6 groups on the average, based on 500 units of the molecular weight, of at least one polar group selected from the group (a) consisting of a phosphate group represented by the formula

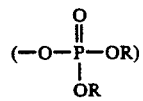

a phosphite group represented by the formula

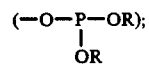

a phosphonate group represented by the formula

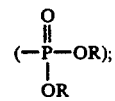

a phosphonite group represented by the formula

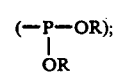

a phosphinate group represented by the formula

a phosphinite group represented by the formula

a tertiary amino group represented by the formula

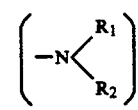

and a quaternary ammonium group represented by the formula

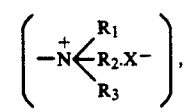

, wherein R is hydrogen atom or a hydrocarbon group, $R_1$, $R_2$, and $R_3$ which may be the same or different are each a straight-chain or branched alkyl or hydroxyalkyl group or an aromatic group, such as a phenyl group or a benzyl group, and X is a counter anion; a carboxyl group (—COOH) and a nitro group.

Polymer (B') has a weight-average molecular weight of 1,000 to 1,000,000 and comprises at least one aromatic ring and 1 to 10 OH groups on the average based on 500 units of the molecular weight and further, as an indispensable component, 0.1 to 4 sulfone groups (—SO$_3$) or 0.1 to 6 groups on the average, based on 500 units of the molecular weight, of at least one polar group selected from the group (a) consisting of a phosphate group represented by the formula

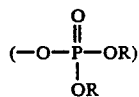

a phosphite group represented by the formula

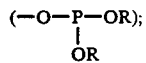

a phosphonate group represented by the formula

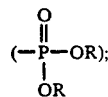

a phosphonite group represented by the formula

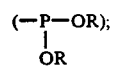

a phosphinate group represented by the formula

a phosphinite group represented by the formula

a tertiary amino group represented by the formula

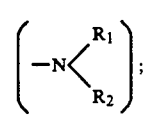

and a quaternary ammonium group represented by the formula

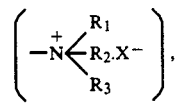

wherein R is a hydrogen atom or a hydrocarbon group, $R_1$, $R_2$, and $R_3$ which may be the same or different are each a straight-chain or branched alkyl or hydroxyalkyl group or an aromatic group, such as a phenyl group or a benzyl group, and X is a counter anion; and a carboxyl group (—COOH), wherein said aromatic rings are linked to each other through a main chain comprising at least one member selected from the group consisting of C—C, C=C, and ether (C—O—C) bonds.

Polymer (A) is defined by formula (A):

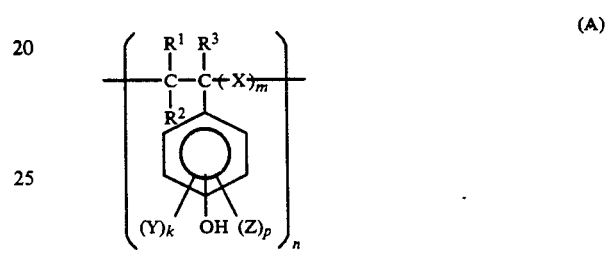

wherein $m \geq 0$ and $n \geq 3$ and each is an arbitrary number necessary for said organic polymer represented by the general formula (A) to have a weight-average molecular weight up to 1,000,000;

$0 \leq k \leq 2$;

$0 \leq p \leq 2$;

provided that $k+p++m \geq 0$;

$R^1$ to $R^3$ are each H or an alkyl group having 1 to 5 carbon atoms;

X is a polymerizable vinyl monomer; and

Y and Z which may be the same or different are each selected from amoung

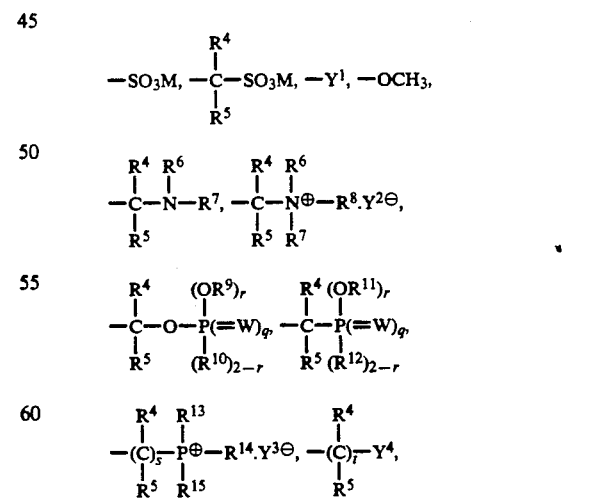

$CR^4R^5OR^6$, —CH$_2$OH, alkyl groups each having 1 to 18 carbon atoms and aryl groups, wherein M is H, an alkali metal, an alkaline earth metal, or an organic cation of an amine etc.;

$Y^1$ and $Y^4$ are each a halogen;

$Y^2$ and $Y^3$ are each a counter ion such as a halogen ion, an organic acid anion, or an inorganic acid anion;

W is S or O;

$R^4$ to $R^8$ which may be the same or different are each a straight-chain or branched alkyl group, an alkyl group derivative such as a hydroxyalkyl group, an aromatic group, or H, provided that $R^6$ and $R^7$ may be combined to form a ring together with the N group;

$R^9$ to $R^{15}$ which may be the same or different are each a straight-chain or branched alkyl group, an alkyl group derivative such as a hydroxyalkyl group, an aromatic group, or H;

q, s, and t are each 0 or 1; and r is 0, 1, or 2.

The magnetic recording medium of the invention can be produced, in general, by the wet method and the evaporation method.

The wet method comprises the steps of immersing a base substrate to plate into an aqueous solution containing a ferromagnetic metal ion, a reducing agent for the metal ion, a complexing agent for the metal ion, a pH buffer, an adjustor and 0.005 to 100 g per liter of the polymer as defined above and co-depositing the metal and the polymer on the substrate, preferably while controlling proportions of the polymer to the entire co-deposited product in the range of 0.01 to 30 percent by weight, to effect the electroless plating.

The evaporation method comprises the step of evaporating and co-depositing on a substrate a ferromagnetic metal and the polymer defined above concurrently, preferably while controlling proportions of the polymer to the entire co-deposited product in the range between 0.001 to 10 percent by weight.

In the present invention, the particle diameter and the shape of coated crystals can be controlled by selecting fundamental skeletons (aromatic rings and hydroxyl groups), types of a polar groups (sulfone groups or the like), effect of the molecular weight (1,000 to 5,000,000) and amount of addition (0.005 to 100 g/l) to be contained in the plating bath of the organic polymer and by selecting the depositing conditions. Moreover the present invention is also improved in corrosion resistance by the function of the organic polymer in the form of a composite material (molecular composite) prepared from a suitable amount of a specified polymer and a metal.

Polymer (B) to be use in the present invention includes two, groups (a) and (b). Group (a) includes a polymer having a weight-average molecular weight of 1,000 to 5,000,000 and comprising, as indispensable components, at least one aromatic ring, 1 to 10 hydroxyl groups on the average and zero to 4 sulfone groups on the average each based on 500 units of the molecular weight Examples of the polymer belonging to group (b) include an anionic water-soluble organic polymer having a weight-average molecular weight of 1,000 to 5,000,000 and comprising at least one aromatic ring having at least one hydroxyl group as a substituent

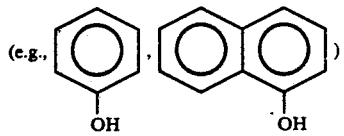

and zero to 4 sulfone groups each based on 500 units of the molecular weight.

The concept of the C—C, C=C, or ether (C—O—C) bond linking an aromatic ring to another aromatic ring includes poly-p-hydroxystyrene, sodium ligninsulfonate and nitrohumic acid. In the present invention, a condensed ring

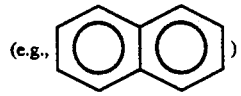

is not regarded as the above-described bond present in the main chain.

The water-soluble organic polymers belonging to the above-described groups (a) and (b) may contain, in their side chain, functional groups other than those described above, e.g., halogen groups, such as Cl and Br, and nitrile, nitro and ester groups.

Examples of the water-soluble organic polymer meeting the requirements of the groups (a) and (b) include the following compounds A-1 to A-11.

A-1: a phenol-formaldehyde resin (a novolak resin), a phenol-furfural resin, a resorcinolformaldehyde resin, a sulfonate of each of the above resin and a derivative of each of the above resin.

A-Z: epoxy resins such as an epoxy resin having a bisphenol A group, epoxyacrylate and phenol(EO)$_5$-glycidylether and a sulfonate of each epoxy resin, and a condensate with formalin of bisphenol A or its sodium sulfonate or bisphenol S or its sodium sulfonate.

A-3: a sulfonate of polyhydroxyvinylpyridine.

A-4: a salt of a condensate of formalin with a sulfated creosote oil, a salt of condensate of formalin with an alkylphenol, its derivative or its sulfonation product, including a m-cresolmethylenesulfonic acid-formalin condensate, a condensate of formalin with sodium m-cresol-bakelitemethylenesulfonate and Schaeffer's acid and a condensate of formalin with 2-(2'-hydroxyphenyl)-2-(2'-hydroxy)-sulfomethylpropane, or a salt of a condensate of formalin with a phenol, a phenolic carboxylic acid or their sulfonation product. Examples of the phenols include phenol, o-cresol, m-cresol, p-cresol, 3,5-xylenol, carvacrol, thymol, catechol, resorcinol, hydroquinone, pyrogallol, and phloroglucinol.

Examples of the phenolic carboxylic acid include salicylic acid, m-hydroxybenzoic acid, p-hydroxybenzoic acid, protocatechuic acid, gentisic acid, $\alpha$-resorcylic acid, $\beta$-resorcylic acid, $\gamma$-resorcylic acid, orsellinic acid, caffeic acid, umbellic acid, gallic acid, and 3-hydroxyphthalic acid.

A-5: a condensate of formalin with mono- or polyhydroxynaphthalene, its derivative or a sulfonation product thereof.

Examples of the monohydroxynaphthalene include $\alpha$-naphthol and $\beta$-naphthol. Examples of the polyhydroxynaphthalene include $\alpha$-naphthohydroquinone (1,4-dihydroxynaphthalene), $\beta$-naphthohydroquinone (1,2-dihydroxynaphthalene), naphthopyrogallol (1,2,3-trihydroxynaphthalene), and naphthoresorcinol (1,3-dihydroxynaphthalene).

A-6: a condensate of formalin with phenylphenolsulfonate.

A.7: a condensate of formalin with dihydroxydiphenyl or its sulfonation product; and a formalin condensate of bishydrbxyphenyl naphthalene, a condensate of formalin with bis(hydroxyphenyl) sulfone naphthalenesulfonate, a condensate of formalin with bis(hydroxydiphenyl) sulfone monomethylsulfonate, and a condensate of formalin with hydroxydiphenyl sulfone monosulfonate.

A-8: a polyhydroxystyrene derivative or its sulfonate such as poly-p-hydroxystyrene, brominated poly-p-hydroxystyrene, poly-p-hydroxymethoxystyrene, and poly-p-hydroxydimethoxystyrene.

A-9: ligninsulfonic acid or salt thereof, which is a compound prepared by treating a pulp mill waste liquor produced as a by-product by various processes and mainly composed of ligninsulfonic acid or salt thereof.

Lignin has a chemical structure comprising a three-dimensional structure composed of a phenylpropane group as the basic skeleton.

With respect to ligninsulfonic acid and salt thereof, various types of products are manufactured and sold by various pulp manufacturers. The molecular weight of the products ranges from 180 to 1,000,000, and the products are available in various types, i.e., have various degrees of sulfonation, are in various salts form and chemically modified form, and contain varied heavy metal ions. All of these types of ligninsulfonic acid and salts thereof are not always useful for attaining the object of the present invention. The effect greatly varies depending upon the types. The object of the present invention can be most effectively attained when a particular ligninsulfonic acid and salt thereof are used. That is, there is a limitation to preferable ligninsulfonic acid and salt thereof which may be used in the present invention. In particular, ligninsulfonic acid and its salt of the present invention is preferred in meeting a requirement that none of these compounds used has a molecular weight of less than 1,000, or if any, only a few would.

There is no particular limitation on the types of ligninsulfonates used in the present invention, and any of sodium, potassium, calcium, ammonium, chromium, iron, aluminum, manganese, and magnesium salts may be used.

A ligninsulfonic acid and salts thereof which have been chelated with heavy metal ions, such as Fe, Cr, Mn, Mg, Zn or Al ions, may also be used in the present invention.

Further, a ligninsulfonic acid and salts thereof, to which other organic compounds, such as naphthalene or phenol, or organic polymers have been added, may also be used. The ligninsulfonic acid and salts thereof used in the present invention may contain impurities derived from the manufacture of pulp. However, the smaller the amount of the impurities, the better the effect of the compound.

A 10: polytannic acid, its derivative and its sulfonation product.

A-11: a sulfonation product of humic acid or nitrated humic acid and a derivative thereof or a salt thereof.

The organic polymer includes the following examples (c) and (d).

Group (c): an anionic, cationic or amphoteric, water-soluble organic polymer having a weight-average molecular weight of 1,000 to 5,000,000 and comprising at least one aromatic ring and 1 to 10 hydroxyl groups on the average and further, as an indispensable component, based on 500 units of the molecular weight, zero to 4 sulfone groups (—SO₃) or zero to 5 groups on the average of at least one polar group selected from the group (a) consisting of a phosphate group represented by the formula

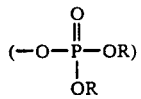

a phosphite group represented by the formula

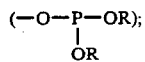

a phosphonate group represented by the formula

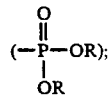

a phosphonite group represented substituent, at least one hydroxyl group based on 500 units of the molecular weight and further, as an indispensable component, based on 500 units of the molecular weight, zero to 4 sulfone groups (—SO₃) or zero to 5 groups on the average of at least one polar group selected from the group (a) consisting of a phosphate group represented by the formula

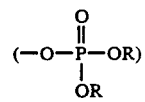

a phosphorite group represented by the formula

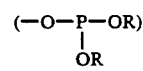

a phosphonate group represented by the formula

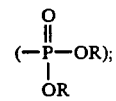

a phosphonite group represented by the formula

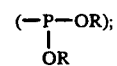

a phosphinate group represented by the formula

a phosphinite group represented by the formula

a tertiary amino group represented by the formula

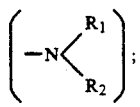

by the formula

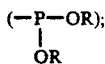

a phosphinate group represented by the formula

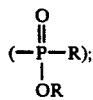

a phosphinite group represented by the formula

a tertiary amino group represented by the formula

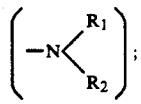

and a quaternary ammonium group represented by the formula

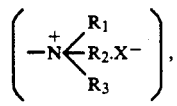

wherein R is a hydrogen atom or a hydrocarbon group, $R_1$, $R_2$, and $R_3$ which may be the same or different are each a straight-chain or branched alkyl or hydroxyalkyl group or an aromatic group, such as a phenyl group or a benzyl group, and X is a counter anion, carboxyl group and nitro group.

Group (d): an anionic, nonionic, cationic or amphoteric, organic polymer having a weight-average molecular weight of 1,000 to 5,000,000 and comprising at least one aromatic ring having, as a a quaternary ammonium group represented by the formula

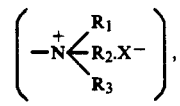

wherein $R_1$, $R_2$, and $R_3$ which may be the same or different are each a straight-chain or branched alkyl or hydroxyalkyl group or an aromatic group, such as a phenyl group or a benzyl group, and X is a counter anion.

The organic polymer having the groups (c) and (d) may also have on its side chain, functional group(s), other than the polar groups shown above, such as halogen e.g., Cl or Bl, and nitril, nitro and ester.

The polymer having the groups (c) and (d) includes the following compounds B-1 to B-4.

B-1: an anionic or amphoteric, organic polymer, prepared by introducing at least one polar group selected from among those of the following group (I), onto a base polymer composed of the above-described organic polymers A-1 to A-11:

polar groups of group (I): tertiary amino, the above-described group (I) into a starting material composed of the above-described polymers A-4' to A-7'.

B-2: a copolymer of poly-p-vinylhydroxystyrene with maleic anhydride; and a product of amination or phosphorylation of the copolymer.

B-3: a sulfonation product of a condensate of formalin with phenylphosphonic acid and a derivative thereof and phenol and a derivative thereof or resorcinol or a derivative thereof; and a salt thereof.

Examples of the derivative of phenylphosphonic acid include monooctyl phenylphosphonate, diphenylphosphonic acid, 0-methyl hydrogen phenylthiophosphoate, and diphenylphosphinic acid.

Examples of the derivative of resorcinol include 2,6-dihydroxyacetophenone, 2,4-dihydroxyacetophenone, resorcinol monomethyl ether, resorcinol monohydroxyethyl ether, 2-methylresorcinol, 7-hydroxy-4-methylcoumarin, and 2-ethylresorcinol.

Examples of phenol include all of the phenols, phenolic carboxylic acids and alkylphenols described above with respect to compound A-4.

B-4: humic acid, nitrohumic acid and salts thereof or amination products of these humic acids.

It is also possible to select at least one member from among the compounds of the above-described quaternary ammonium base, carboxyl, phosphate, phosphite, phosphonate, phosphonite, phosphinate, and phosphinite groups; or an anionic, cationic or amphoteric and waterorganic polymer prepared by introducing at least one polar group selected from among those of the above-described group (I) into a starting material composed of an organic polymer before sulfonation in the organnic polymers A-1, A-2, A-3, A-4, A-8, A-9, A-10, and A-11; or a compound prepared by modifying the following starting material composed of the formalin condensate A-4, A-5, A-6, or A-7 which is free of the sulfone group:

A-4': a condensate of formalin with phenol, a phenolic carboxylic acid, or an alkylphenol and a derivative thereof, A-5': a condensate of formalin with mono- or polyhydroxynaphthalene and a derivative thereof, A-6': a condensate of formalin with phenylphenol, A-7'a condensate of formalin with dihydroxydiphenyl, or the like, i.e., an anionic, cationic or amphoteric, waterorganic polymer prepared by introducing at least one polar group selected from among those of A or B or both of the above-described groups A and B and use them in the form of a mixture. There is no limitation as to the type of the salt of organic polymer, and sodium, calcium and ammonium salts, etc., may be used.

Further, examples of the organic polymer of hydroxystyrene, which may be used in the present invention, include a-water-soluble organic polymer having a weight-average molecular weight of 1,000 to 5,000,000 and comprising, as an indispensable component, based on 500 units of the molecular weight, at least 0.5 aromatic ring having at least one hydroxyl group (—OH).

The above-described organic polymer may contain, in its side chain, functional groups other than those described above, e.g., halogen groups, such as Cl and Br, and nitrile, nitro and ester groups.

The present inventors have found that a magnetic coating having excellent corrosion resistance can be prepared by the use of an additive for a plating bath comprising, among the above-described organic polymers, a water-soluble organic polymer represented by the following general formula (A):

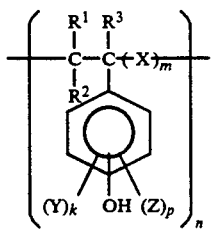

wherein $m \geqq 0$ and $n \geqq 3$ and each is an arbitrary number necessary for said organic polymer represented by the general formula (A) to have a weight average molecular weight up to 1,000,000;

$0 \leqq k \leqq 2$;

$0 \leqq p \leqq 2$;

provided that $k+p+m \geqq 0$;

$R^1$ to $R^3$ are each H or an alkyl group having 1 to 5 carbon atoms;

X is a polymerizable vinyl monomer; and

Y and Z which may be the same or different are each selected from among

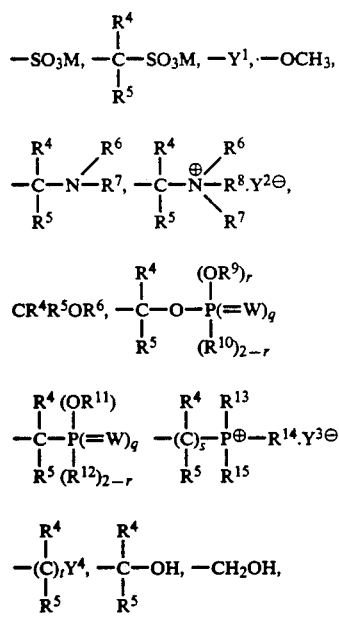

alkyl groups each having 1 to 18 carbon atoms and aryl groups, wherein M is H, an alkali metal, an alkaline earth metal, or an organic cation of an amine ets.;

$Y^1$ and $Y^4$ are each a halogen;

$Y^{2\ominus}$ and $Y^{3\ominus}$ are each a counter ion such as a halogen ion, an organic acid anion, or an inorganic acid anion;

W is S or O;

$R^4$ to $R^8$ which may be the same or different are each a straight-chain or branched alkyl group, an alkyl group derivative such as a hydroxyalkyl group, an aromatic group, or H, provided that $R^4$ and $R^7$ may be combined to form a ring together with the N group;

$R^9$ to $R^{15}$ which may be the same or different are each a straight-chain or branched alkyl group, an alkyl group derivative such as a hydroxyalkyl group, an aromatic group, or H;

q, s, and t are each 0 or 1; and r is 0, 1, or 2.

In the above-described general formula (A), m, n, k, and p are each not limited to an integer and may be any number (a real number) in a particular range. On the level of a monomer constituting a polymer, it is a matter of course that k and p are each an integer. On the level of a constituent block unit, m is an integer, while on the level of a molecule, n is an integer. However, a polymer is essentially a mixture, and it is more proper to regard the property of the mixture as the property of the polymer than to judge the property of the polymer from that of the individual constituent unit. Therefore, in the present invention the general formula (A) represents an average composition.

The organic polymer of hydroxystyrene represented by the general formula (A) may be a homopolymer of a monomer having or is free from a substituent represented by Y or Z in the general formula (A), such as hydroxystyrene, isopropenylphenol (hydroxy-α-methylstyrene) or hydroxy-α-ethylstyrene, a copolymer of the monomers thereof, or a copolymer of the above-described hydroxystyrene monomer with other polymerizable vinyl monomer (X). Hydroxystyrene, isopropenylphenol, or the like, which is a polymer unit may be an ortho, meta or para isomer or a mixture of these units, among which a para or meta isomer is preferable.

With respect to the above-described copolymer, examples of the other vinyl monomer include maleic anhydride, maleic acid, acrylic acid, methyl methacrylate, methacrylic acid, glycidyl methacrylate, hydroxyethyl methacrylate, itaconic acid, allylsulfonic acid, styrenesulfonic acid, ethyl acrylate phosphate, acrylamide, 2-acrylamido-2-methylpropanesulfonic acid, acrylonitrile, maleimide, vinylpyridine, acrylic ester, methacrylic ester, fumaric ester or vinyl esters of various organic acids. In this case, the molar ratio of the hydroxystyrene compound unit, such as hydroxystyrene or isopropenylphenol unit, to the other vinyl monomer is preferably 1/10 to 20/1. Suitable examples of the alkali metal or alkaline earth metal M in the substituent of the hydroxystyrene unit, i.e.,

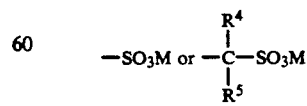

include Li, Na, K, Mg, Ca, Sr, and Ba. The introduction of the sulfone group can be attained by an ordinary sulfonation process in which fuming sulfuric acid, sulfuric anhydride, or the like is used as a sulfonating agent. $R^4$ to $R^8$ in the substituent

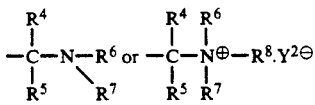

which may be the same or different is selected from among a straight-chain or branched alkyl group having 1 to 36 carbon atoms, an alkyl derivative group such as a hydroxyalkyl, aminoalkyl, phosphoalkyl or mercaptoalkyl group, and an aromatic group such as a benzyl group substituted with a straight-chain or branched alkyl group having 1 to 16 carbon atoms. $R^6$ and $R^7$ may be combined to form a ring. Therefore, preferable examples of $R^4$ to $R^8$ include a straight-chain or branched alkyl group, a hydroxyalkyl group, or an aromatic group substituted with a straight-chain or branched alkyl group having 1 to 5 carbon atoms. With respect to the introduction of the above-described tertiary amino group,

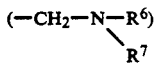

can easily be prepared by, e.g., the Mannich reaction in which a dialkylamine and formaldehyde are employed.

An organic or inorganic acid for neutralizing the amino moiety may be used in order to improve the water-solubility. Examples of the acid useful for this purpose include acetic acid, citric acid, oxalic acid, ascorbic acid, phenylsulfonic acid, chloromethylphosphonic acid, monochloroacetic acid, dichloroacetic acid, trichloroacetic acid, trifuloroacetic acid, sulfuric acid, phosphoric acid, hydrochloric acid, boric acid, nitric acid, hydrofluoric acid, hexafluorosilisic acid, hexafluorotitanic acid, and hexafluorozirconic acid. These acids may be used either alone or in the form of a mixture.

With respect to the introduction of the quaternary ammonium base, $$(-CH_2-\underset{R^7}{\overset{R^6}{N}}-R^8.Y^-)$$

can easily be prepared by, e.g., the Menshutkin reaction which is a reaction of the above-described tertiary amine compound with an alkyl halide.

$R^9$ to $R^{15}$ in the following substituents of the hydroxystyrene unit:

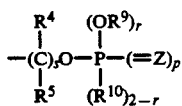 (C)

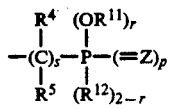 (D)

which may be the same or different are selected from among a straight-chain or branched alkyl group having 1 to 36 carbon atoms, an alkyl derivative group such as a hydroxyalkyl, aminoalkyl, mercaptoalkyl or phosphoalkyl group, and an aromatic group such as a phenyl group substituted with a straight-chain or branched alkyl group having 1 to 16 carbon atoms, provided that the carbon chain has such a length as will cause the water-solubility of the above-described compound (A) to disappear. In view of the above, preferable examples of $R^9$ to $R^{15}$ include a straight-chain or branched alkyl or hydroxyalkyl group having 1 to 8 carbon atoms, or an aromatic group substituted with a straight-chain or branched alkyl group having 1 to 5 carbon atoms. The hydroxystyrene polymer represented by the formula (D) can be prepared by, e.g., a process described in Japanese Patent Laid-Open No. 47489/1978, i.e., by halogenating or halomethylating a hydroxystyrene polymer, reacting the product with a trivalent phosphorus compound (Arbuzov reaction), and subjecting the reaction product to thermal rearrangement. The hydroxystyrene polymer represented by the formula (C) can be prepared by, e.g., a process described in Japanese Patent Laid-Open No. 71190/1978, i.e., by hydroxymethylating a hydroxystyrene polymer and reacting the product with a reagent for introducing a phosphoric acid or ester group. A hydroxystyrene polymer substituted by a phosphonium group represented by the formula

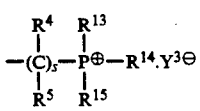

can easily be prepared by, e.g., a process described in Japanese Patent Laid-Open No. 34444/1986, i.e., by reacting a hydrogen halide and formaldehyde with a hydroxystyrene polymer to effect halogenomethylation (e.g., chloromethylation) and then reacting a trivalent phosphite with the product. The hydroxystyrene polymer may be one prepared by any process, and it does not matter how the polymer has been prepared. For example, poly-p-hydroxystyrene which is a polyhydroxystyrene homopolymer can easily be prepared by cationic, radical, organic acid, or thermal polymerization of p-hydroxystyrene. The organic acid polymerization products a polymer having a weight-average molecular weight of tens of thousands to hundreds of thousands, the thermal polymerization produces a polymer having a weight-average molecular weight of thousands to tens of thousands, and the radical polymerization of p-acetoxystyrene followed by hydrolysis produces poly-p-hydroxystyrene having a weight average molecular weight of tens of thousands to 2,000,000.

The organic polymer preferably includes one of groups (a) and (b), which have all or part of hydroxyl group(s) attached on the aromatic ring(s). The polymer (A) is most preferable. The polymer having a hydroxyl group is attached to the aromatic ring thereof, could be easily dispersed into the metal crystal, forming a complex therewith, which improve its resistance to corrosion. The complex between the metal and the polymer (A) has a smaller inside stress and is improved also in its adhesion to a substrate.

A polymer having a metal in its molecular chain which may be used in the present invention, includes groups (i) and (ii) listed below.

(i) polymer having a metal in its main chain

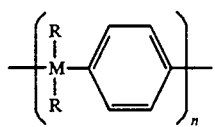
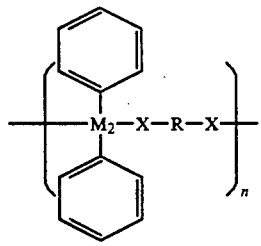
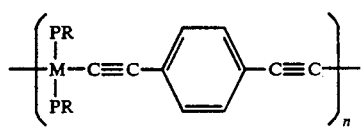
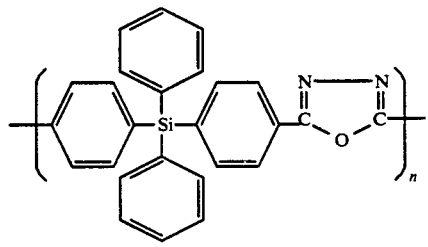
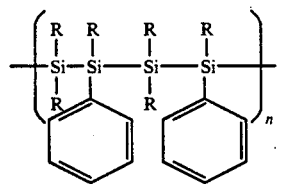
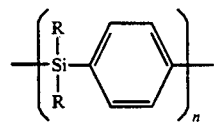
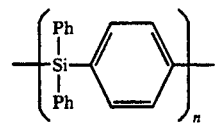
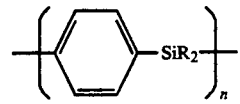
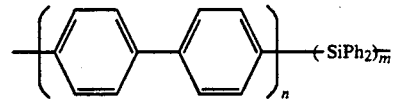

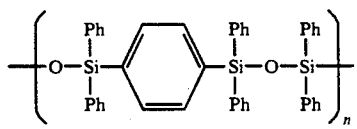

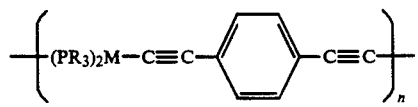

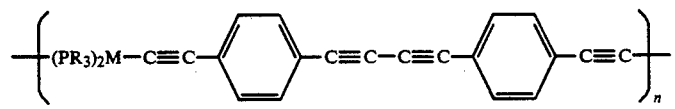

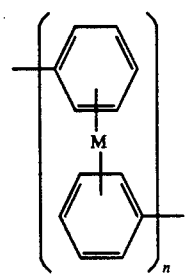

In the formulae listed above, R is an alkyl, Ph is phenyl, M is one of Co, Ni, Ti, Pd, Pt, Zr, Hf, Rh, Fe, V, Cr, Mo and Si, X is oxygen, nitrogen or sulfur, n is a natural number being larger than 5, l is a natural number, and m is an integer being not less than 1.

In addition to the metal-containing organic polymer shown above, the group (i) also includes organic polymers defined by the groups (a) to (d) and then containing a metal in their main chain.

(ii) a polymer having a metal in its side chain

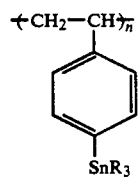

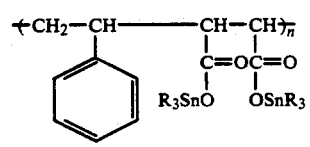

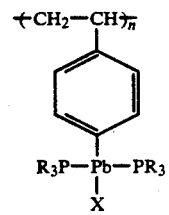

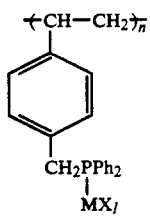

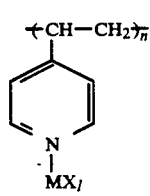

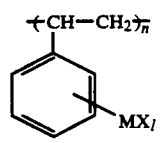

-continued

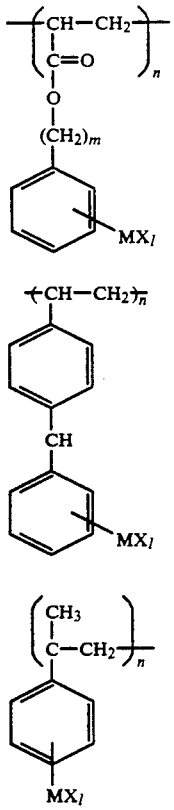

In the formulae, R, Ph, M, n and l are defined above in the groups (i) and X1 is one of Cl, Br, CN, Ph and CO3. m is an integer of 1 to 20. In the above shown polymers, the group (ii) further includes polymers defined by the groups (a) to (d) and containing a metal in their side chains.

The reason why the organometallic polymer is used is for improving the decomposition stability at the time of physical vapor deposition when an organic polymer is introduced into a metal element, and for improving the resistance to corrosion of the magnetic film that will occur due to the chemical and electrochemical properties of the metal element. The present inventors have found that the action of hydroxyl groups and polar groups can improve the corrosion resistance, and that when an aromatic organic polymer is used in the composite material, different metal elements can be made into a composite relatively easy in a microscopic fashion, and excellent corrosion resistance due to the interaction between the polymer and the contained metal can be realized. As one of the features of the case using the organometallic polymer it can be mentioned that the effect of improving corrosion resistance is recognized with the codeposited amount smaller than that of the case wherein a polymer free from a metal element is co-deposited.

In the method for the production of the present invention, there are two major features: a first feature is that an organic polymer and a magnetic metal are made into a composite (are made into a molecular composite) on a molecular level (in the order of molecules), and an organic polymer is co-deposited at the grain boundaries (i.e., between the grains) and in the grains of the metal or only in the grains of the metal thereby making the organic polymer into a composite; and a second feature is that only a small amount (0.001 to 10 wt. %) of an organic polymer is made into a composite to improve the corrosion resistance.

Figure 1A:
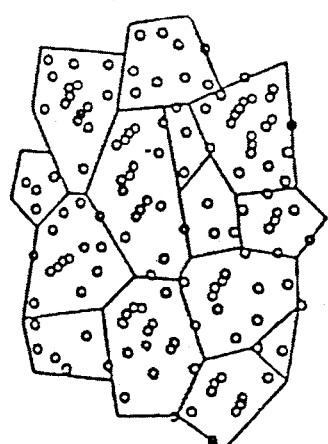
FIG. 1(a), (b) and (d) show the co-deposition of grains of metal crystals and polymer particles and on the other hand FIG. 1 (c) shows the prior magnetic material to the same effect.
Figure 1B:
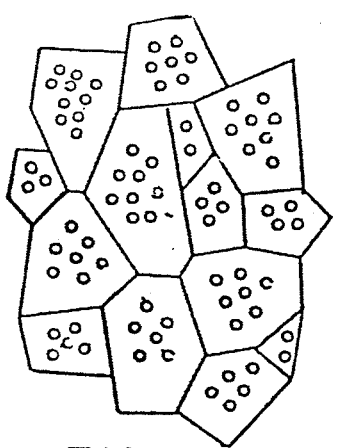
Figure 1C:
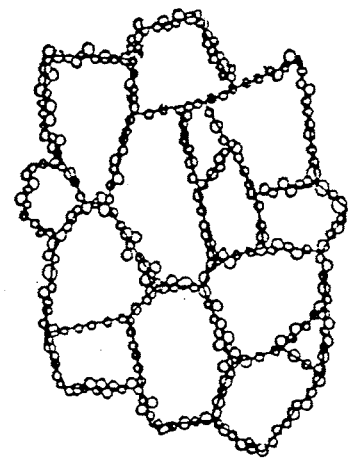
Figure 1D:
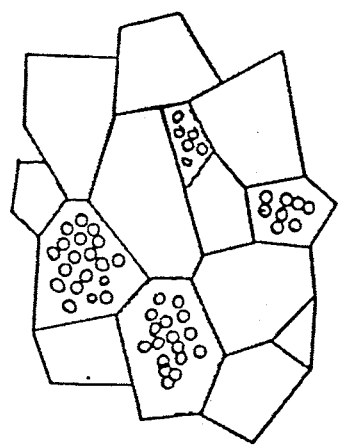
Figure 2A:
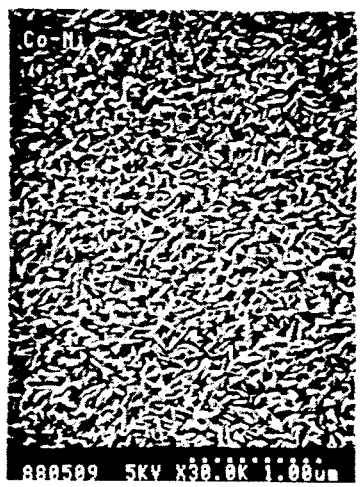
FIG. 2 shows pictures of SEM (scanning electron microscope) on the surface of a magnetic layer of Co and Ni in FIG. 2(a), shown in Comparative Example 104, and the surface of a complex magnetic layer of Co, Ni and a polymer in FIG. (b), shown in Example 76. It is seen that the grains of the metal crystal become a little smaller with a complex with the polymer and then more round. The polymer is not seen to have been maldistributed.
Figure 2B:
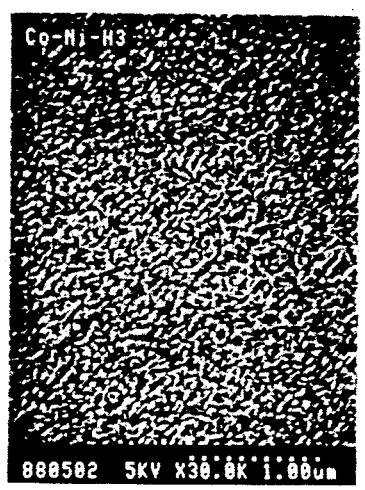
Figure 3A:
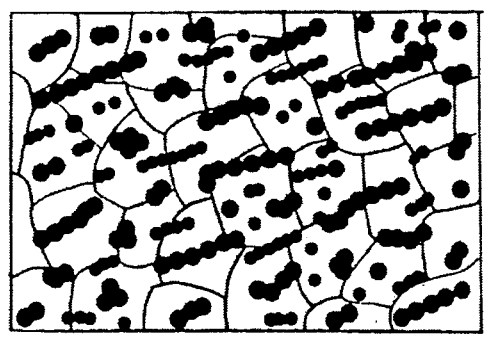
FIG. 3(a) and (b), FIG. 4(a) and (b) and FIG. 5(a) and (b) show pictures of TEM on super-thin slices of the magnetic films obtained in Examples 76, 80 and 79, respectively, on the part of (b) and then illustrate them in (a). In the phase-contrast method, the pictures show the co-deposited polymer which is seen in the form of rods or dots and has a particle size of about 50 to 100 A, being of the molecular order, well dispersed and complexed with the metal. The metal is found to have a crystal size of about 500 A.
Figure 3B:
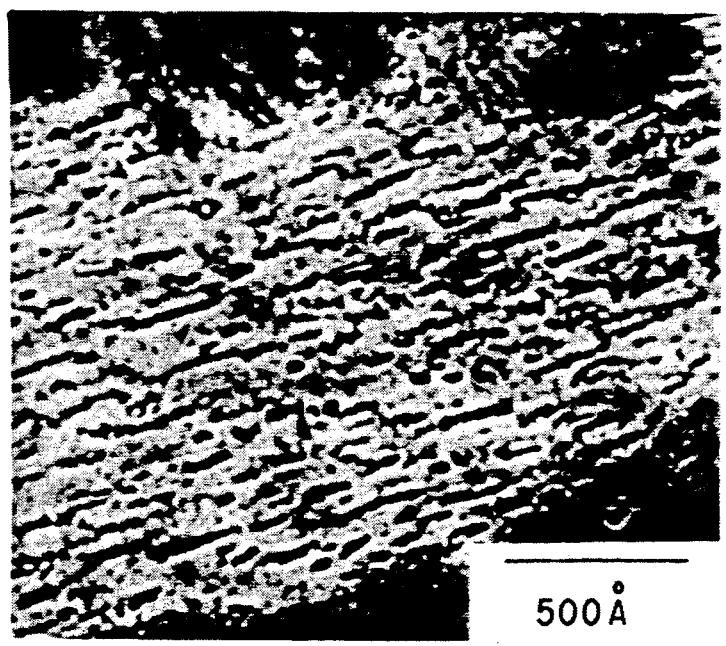
Figure 4A:
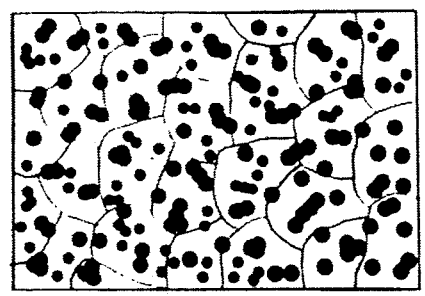
Figure 4B:
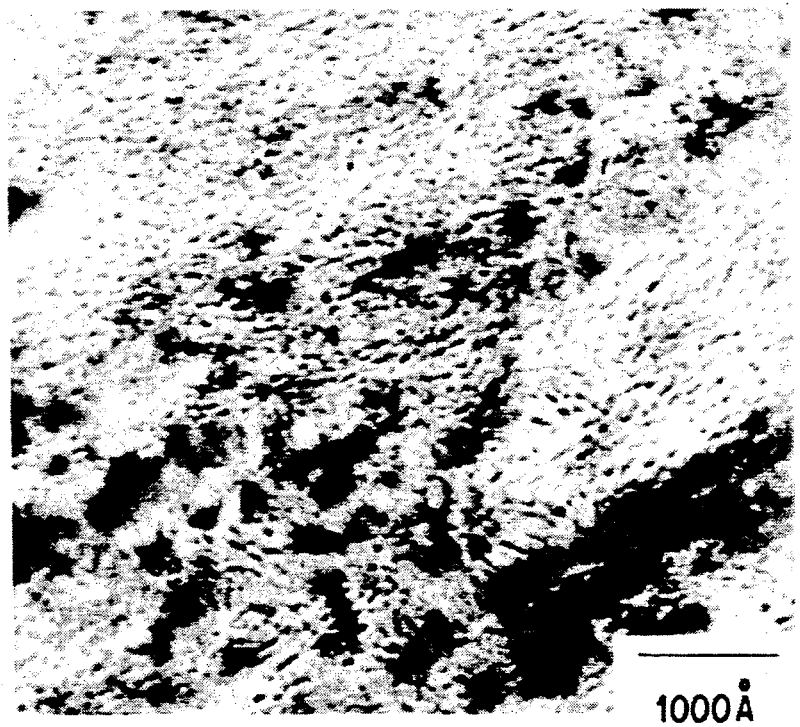
Figure 5A:
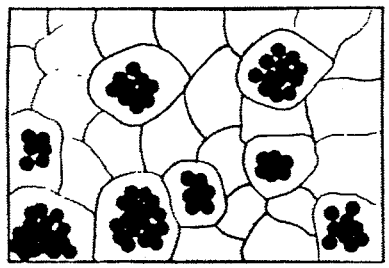
Figure 5B:

One example of the film structure of the present invention having such a significant feature is that it takes a co-deposition pattern of the model drawing a, b or d of FIG. 1. They are hereinafter referred to generally as a molecular composite film. In the type as shown by the pattern C wherein an organic polymer flocculates and segregates only at the grain boundaries, an improvement of corrosion resistance as intended by the present invention cannot be attained. The reason for this is considered to be as follows; thus, it is known that corrosion of a metal generally starts at grain boundaries and progresses along the boundaries, and the diffusion of $H_2O$, and $O_2$ that are essential components for a corrosion reaction is higher in an organic polymer than in a metal; therefore, it is considered that the co-deposited state of the pattern C facilitates the diffusion of corrosive components, and not only cancels the effect of a specified organic polymer of suppressing corrosion, but also facilitates a corrosion reaction.

By attaining this molecular composite structure, for the first time the formation of a composite of an organic polymer can be realized without influencing adversely the magnetic properties of magnetic metal crystals. In the present invention, it has been found that the chemical structure of an organic polymer to be used has a quite important action in the attainment of the molecular composite film structure that acts an important role in the present invention.

The ferromagnetic film used in the present invention refers to Co, Fe, Ni or Cr or an alloy, using it as a base such as Co—Ni, Co—Fe, Co—Cr, Co—Cu, Co—Pt, Co—Cd, Co—Sn, Co—Ni—Cr and their oxides, and may include an in-plane magnetized film and a perpendicularly magnetized film according the magnetizing method.

The organic polymers that can be used in the present invention are limited to those having a weight-average molecular weight in the range of 1,000 to 5,000,000, preferably 1,000 to 1,000,000. This is because the molecular weight of the organic polymer affects the effect of the present invention, and if the polymer has a molecular weight of less than 1,000, it is liable to decompose during the physical vapor deposition, and the effect of improving corrosion resistance is hardly secured, while if the polymer has a molecular weight of more than 5,000,000, the physical vapor deposition becomes difficult or it dissolves or disperses poorly in a plating bath, which causes such a problem that the concentration thereof in the plating bath is limited, and at the same time the effect of the present invention is hardly secured. When organic polymers are to be charged into a plating bath, it is better to use an organic polymer having a rather smaller molecular weight because it will be easily attained to dissolve and disperse it stably although the amount of the organic polymer that will dissolve depends on the pH of the bath, the concentration of the salts involved, the density of the polar groups of the polymer, and so on. Further if the organic polymer has a rather smaller molecular weight, a uniform polymer composite film is easily obtained. In contrast, if a film is formed by physical vapor deposition, the upper limit of the molecular weight of organic polymers is not too restricted in comparison with the case of the plating method, and when the organic polymer has a rather higher molecular weight, the magnetic properties are hardly disturbed, and good results are liable to be obtained.

Polar groups (excluding hydroxyl groups and aromatic rings) such as sulfone groups and phosphoric acid groups are important because they provide corrosion resistance and solubility of the organic polymer into the plating bath, and the preferable range of the density of polar groups is 0.1 to 5 groups, more preferably 1 to 3 groups, per a molecular weight of 500, on average. If the density of polar groups is less than 0.1 group, it causes a problem that it dissolves in the plating bath poorly, while if the density of polar groups exceeds 5 groups, it causes such a problem that the corrosion resistance of the deposit film lowers. However, if a physical vapor deposition method is used, it is preferable that there are these polar groups, but they are not required necessarily.

The presence of hydroxyl groups is quite important in the present invention. The action is not necessarily clarified, but it seems that hydroxyl groups have various actions. For instance, it seems that they have such actions that they influence the adsorption and reactivity of the polymer onto the metal matrix, and that they densify and stabilize corrosion products thereby improving corrosion resistance. It is preferable that hydroxyl groups are bonded as substituents directly to the aromatic rings because their effects are exhibited well. The main chain connecting the aromatic rings is most preferably composed of C—C bonds and C=C bonds free from a hetero atom, and C—O—C bonds are more preferable to constitute the main chain connecting the aromatic rings because of the stability to decomposition during the physical vapor deposition and because of the stability to decomposition under a corrosive environment.

The above factors such as the molecular weight, the constitutional unit, the type and the density of polar groups, and the type of the main chain of organic polymers are important factors for the additive of the present invention and play essential roles.

In carrying out the present invention, the amount of the organic polymer to be added to a plating bath is in the range of 0.005 to 100 g/l, preferably 0.01 to 20 g/l. If the amount of the organic polymer to be added is less than 0.005 g/l, the effect is not observed, while the amount exceeds 100 g/l, the deposit film becomes brittle, causing a practical problem. In the present invention, although the addition of one organic polymer exhibits its effects, several organic polymers may be combined to be used.

The content of the organic polymer in the deposited film is in the range of 0.001 to 10 wt. %, preferably 0.01 to 1 wt. %, and most preferably 0.05 to 0.5 wt. %, based on the total weight of the deposited film. If the co-deposited amount of the organic polymer is small, the corrosion preventive effect is hardly exhibited because the film is brought nearly to a simple metal deposit, while if the co-deposited amount is too excessive, the deposited film becomes brittle, causing a practical problem. The assessment of the brittleness can be easily found by subjecting a sample deposited on a PET film substrate to a tensile test, and measuring the elongation of the deposited film at the point where the electroconductivity has disappeared.

The co-deposited amount of the organic polymer varies depending on the concentration of the organic polymer, the stirring, and the charge of the organic polymer. Therefore, during the plating, the amount of the organic polymer that will be co-deposited in the deposit is controlled by selecting the above factors, which can be easily carried out.

As ferromagnetic metal ions, one or more different types of ions comprising cobalt ions, nickel ions, and iron ions are used, and they are supplied by dissolving soluble salts such as sulfates, chlorides, or acetates of cobalt, nickel or iron in an electroless plating bath. Cobalt ions are used in a concentration in the range of 0.005 to 2 mol/l, preferably 0.01 to 0.2 mol/l. Nickel ions are used in a concentration in the range of 0.001 to 1.5 mol/l, preferably 0.05 to 0.20 mol/l. Iron ions are used in a concentration in the range of 0.002 to 1 mol/l, preferably 0.01 to 0.15 mol/l.

As ferromagnetic metal ions used in the present invention, one or more of Co, Ni and Fe is used as major component, but small amounts of ions of Mg, Al, Ru, Si, Ti, V, Cr, Cu, Zn, Ga, Ge, Mo, Rh, Mn, Pd, Ag, Au, Pt, Sn, Te, Ba, Ce, Pr, Sm, Re, W, Os, Pb, Bi, etc., may be contained, and these ions may be supplied by adding their soluble salts. In the deposit, in addition to these metals, sometimes, P, or B may be present depending on the type of a reducing agent or a nonmetal such as C, N, O, S, As, etc., may be present depending on the type of an additive.

Although as a reducing agent for the metal ions, generally a hypophosphite is used, a hydrazine salt, a borohydride or the like may also be used. The reducing agent is used in the range of 0.01 to 1 mol/l.

As the complexing agent for the metal ions use is made of carboxylic acids such as formic acid, acetic acid, propionic acid, butyric acid, glycolic acid, lactic acid, oxalic acid, succinic acid, malonic acid, maleic acid, itaconic acid, phthalic acid, malic acid, salicylic acid, tartaric acid, tartronic acid, ascorbic acid, and citric acid, amino acids such as glutamic acid, glycine, and asparaginic acid, weak acids such as gluconic acid, and glutonic acid, or their salts, which may be used alone or in combination. These complexing agents are used in a concentration in the range of 0.02 to 1.5 mol/l, preferably 0.1 to 0.8 mol/l.

As a pH buffer, an ammonium salt, a carbonate, an organic acid salt is used, and it is used in a concentration in the range of 0.01 to 2.5 mol/l.

As a pH adjuster, an alkali such as ammonia, and sodium hydroxide is used to increase the pH and an acid such as sulfuric acid, and hydrochloric acid is used to decrease the pH.

Usually, the plating solution that has not yet been made up without a pH adjuster being added is between an approximately neutral solution and an acid solution, and the pH is adjusted by adding the above hydroxide to become alkaline. If the pH exceeds a prescribed value, an acid such as hydrochloric acid, sulfuric acid, nitric acid, etc., is used.

The, the method of the production by physical vapor deposition is described as follows.

The method of the present invention can be carried out by any of the methods that are generally called physical vapor deposition processes presented in known literatures. That is, any of the following processes can be applied: the vacuum vapor deposition process wherein raw materials for plating are vaporized under reduced pressure and are allowed to condense on a substrate; the ion plating process wherein raw materials for plating that have been vaporized are ionized under glow discharge to be activated and allowed to deposit on a substrate; and the sputtering process wherein glow discharge is effected in an inert gas atmosphere so that raw materials for plating may be ionized and ejected by the bombardment of the ionized gas and then may be attracted to a substrate to be deposit thereon. The sputtering process includes the high-frequency or direct current type magnetron sputtering system, the opposed target type sputtering system, and the ion beam sputtering system, any of which may be used. To make the organic polymer into a composite stably, the sputtering process is preferable, and amongst others the high-frequency type magnetron sputtering system, or the high-frequency opposed target type sputtering system, or the ion beam sputtering system is most preferable.

The technique for depositing physically organic polymers is already known. For instance, there are deposited films of polyethylene, sputtered films of polytetrafluoroethylene or polyacrylonitrile, etc. However, these known techniques are for forming a single film, and are not intended for the prevention of corrosion as in the present invention. There is also a report wherein electric characteristics concerning a deposited film of copper and polyethylene are measured. The copper/polyethylene composite film, in that report is unstable, the structure of the film is such that the deposited metal takes the shape of islands cohered in the polymer, and the report was directed only to the fact that the electric resistance changes by annealing, so that the film in the report is different substantially from the present magnetic recording thin film which is highly resistant to corrosion.

There are also a report related to a method of producing a magnetic recording medium (Japanese Patent Application Laid-Open No. 281120/1987) wherein an organometallic monomer gas is introduced during vacuum deposition of a ferromagnetic metal, and glow discharge treatment is carried out so that an organic polymer is allowed to coexist at the boundaries of columnar grains (between grains) of the segregated ferromagnetic material, and a report related to the production of a Co-Cr-polyethylene film wherein Co-Cr alloy and polyethylene are simultaneously deposited.

However, in the former case, since an organic monomer gas is used, an organic material segregates only at the grain boundaries (between grains), and therefore the film structure is substantially different from that of the present invention, so that an effect of improving corrosion resistance at the level that will be attained by the present invention cannot be secured. In the latter case, since an organic material segregates only at the boundaries (between grains) probably due to violent decomposition of polyethylene, and the magnetic properties such as the coercive force lowers remarkably, the film cannot be used practically, as a magnetic recording medium. As will be understood from the above description, if a common organic polymer is used, it is liable to suffer the decomposition during the physical vapor deposition, and probably due to the presence of organic polymers whose molecular weights have been reduced by the decomposition, the magnetic properties are greatly disturbed-particularly the coercive force is lowered—, so that the film cannot be used in practice as a magnetic recording medium.

In the present invention, attention is particularly directed to the stability of an organic polymer to decomposition, and useful chemical structures of organic polymers have been decided. That is, it has been found that it is preferable to use, as polymers to be used in physical vapor deposition, aromatic organic polymers having a weight-average molecular weight of 1,000 to 5,000,000, and the selection of polar groups having an effect of increasing the melting point and the selection of the range of the molecular weight are also important.

The present invention is carried out under a pressure of $10^{-1}$ to $10^{-6}$ Torr. The optimum range of the pressure is determined from the points of the vapor deposition process, the vapor deposition speed, the level of the quality of the product, and the economy. That is, in the case of ion plating or sputtering, the present invention is carried out under a pressure of up to $10^{-1}$ Torr and between $10^{-2}$ and $10^{-3}$ Torr where glow discharge will occur, and the gas to be introduced is nitrogen, helium, argon, or the like. Nitrogen has such a defect that it is liable to form nitrogen oxides during the discharge, and helium has such a defect that it is weak in ionization force. In the present invention, argon is most preferable. The pressure in the case of vacuum deposition is $10^{-2}$ to $10^{-6}$ Torr, preferably up to $10^{-4}$ Torr (i.e., in the range of $10^{-4}$ to $10^{31\ 6}$ Torr). In the case of vacuum deposition, a pressure of $10^{-4}$ Torr or higher makes the deposition speed too slow, and makes the quality of the magnetic film poor, particularly the adhesion to the substrate, and a pressure of $10^{-6}$ Torr or below makes the practical operation line long, which is not economical. In the case of ion plating and sputtering, it is carried out under a pressure of $10^{-2}$ to $10^3$ Torr where glow discharge will occur to provide a magnetic film good in magnetic property.

As vapor sources, a metal and an organic polymer may be evaporated separately or a composite vapor source may be used, obtained by mixing the metal and the organic polymer in advance with each other as far as they are similar to each other in their evaporating temperature and vapor pressure. As a heating source, a resistance heating process, an induction heating process, an electron beam process, or a combination of these may be used. As a crucible, in the case of the electron beam process, a water-cooled copper crucible, ceramics, etc., can be used, and in the case of other heating processes, a carbon boat, a tungsten boat, a tantalum boat, and a ceramic boat can be used. In the case of the sputtering process, sputtering is carried out using, as target, a composite target of an organic polymer and a metal or a single organic polymer target and a single metal target. In this case, in order to obviate that the temperature rises, it is preferable that the target and the deposited matrix are cooled if required. Although the evaporation speed varies depending on the types of the metal and the organic polymer, the degree of vacuum, and the heating temperature, there is not any particular restriction on the evaporation speed in the present invention.

The magnetic film thickness is in the range of 0.005 to 5 μm, and in the case for high density recording, the magnetic film thickness is preferably up to 0.2 μm.

As a substrate on which the magnetic film will be formed, use is made of a non-metallic substrate such as PET film (polyethylene terephthalate film), polyimide film, a glass substrate, and a ceramic substrate that have been activated suitably, and a metal substrate for example made of an Al alloy.

The recording medium according to the present invention has characteristic effects given below under (1) to (4):

1) In a magnetic film an organic polymer is made into a composite in the order of the molecules, thus due to the action of the co-deposited polymer, local cells formed by corrosion are subject to the dispersion effect and the electrical insulating effect, and the corrosion resistance increases due to the oxygen barrier property and the corrosion prevention property.

2) By the action of the organic polymer, the metal crystals are further made minute, the crystal size is further made uniform, and the recording medium is made smooth, so that the corrosion resistance is improved.

3) By the action of the water-soluble organic polymer, trapping of $H_2$ gas in the deposit is suppressed, thereby making the film dense.

4) The amount of the water-soluble organic polymer that will be co-deposited into the deposit matrix is determined by the molecular weight, the basic skeleton, the type of the polar groups, the density of the polar groups, and the content of the water-soluble organic polymer that will be incorporated into the plating bath, and by the interaction of the plating conditions. By said interaction, the diameter and the shape of the deposited grains can be controlled, and particularly the molecular weight, the type and the density of polar groups influence greatly the corrosion resistance, and the diameter and the shape of the grains.

In the present invention, the composite material is formed from the deposited metal and the polymer on a molecular level. This not only contributes to a remarkable improvement in the corrosion resistance of the deposited coating layer but also brings about an effect that no defects causing an error of the recording medium is formed.

A magnetic film containing the organic polymer of the present invention incorporated therein exhibits magnetic characteristics equal or superior to those of the conventional plated magnetic film and further has excellent corrosion resistance. For this reason, it is possible to remarkably reduce the thickness of the protective layer commonly used in the conventional recording medium while maintaining the reliability of the recording medium.

This enables a reduction in the burden of the protective layer, so that the process can be simplified. Further, since the distance between the head and the magnetic film can be reduced, not only spacing loss can be suppressed but also it becomes possible to cope with an increase in the density. This effect is very advantageous from the industrial viewpoint.

EXAMPLES

The present invention is further described in more detail with reference to the following Examples, but the present invention is not limited to the Examples.

Pretreatment for Plating

In the case where PET film (having a thickness of 10 μm) was used, the PET film was etched with an aqueous solution of 75 g of NaOH solution in 1 liter of water at 60° C. for 5 to 15 min, and then was immersed in an aqueous solution of 0.1 g of SnCl in 1 liter of water at 25° C. for 2 to 4 min, then in an aqueous solution of 0.1 g of $AgNO_3$ at 25° C. for 2 to 4 min, and then in an aqueous solution of 0.1 g of $PdCl_2$ at 25° C. for 2 to 4 min to activate the PET surface. In some cases, PET film on which Pd nuclei had been deposited by the sputtering process was used (Lumine, a tradename of oray ndustries, Inc.).

In the case using an Al alloy substrate, a non-magnetic Ni-P layer was deposited on the Al alloy surface, and then a magnetic deposit was formed thereon.

The Plating Baths and the Plating Conditions

The water-soluble organic polymers used in the plating baths of the present invention are shown in Table 1, comparative organic polymers are shown in Table 2, and the basic plating bath compositions that were used are shown in Table 3. The plating bath compositions of the present invention formed by combining them are shown in Table 4.

The plating time was 190 sec, and a thickness of 800 to 1600 Å was obtained.

The Physical Vapor Deposition Conditions i) Magnetron sputtering:

In a high-frequency magnetron sputtering apparatus, by using a Cr target for the formation of a primary coat, and a Co—30 % Ni alloy target for a recording layer or Co-40% Fe, Co-25% Pt alloy target, having a size of 3 inches, a primary Cr coat having a thickness of 5,000 A, and a recording layer having a thickness of 600 A were formed. The sputtering conditions of the recording layer were as follows: the preparatory evacuation: $3 \times 10^{-6}$ Torr; the Ar gas pressure: mainly 5 m Torr; the output: mainly 200 W; and the substrate temperature: room temperature. The organic polymer was formed into cubic pellets (5 mm × 5 mm × 5 mm), and a required number of the pellets were fixed on suitable positions of the alloy target so that they might be used as a metalorganic polymer composite target. A substrate of glass having a thickness of 90 mm was used.

ii) The Opposed Target Type Sputtering:

An opposed target type sputtering apparatus was used with the plate interval being 100 mm to form a film. Other conditions followed those of the magnetron sputtering process.

iii) The Vacuum Deposition Process (of the Electron Beam Heating Type):

A vacuum deposition apparatus with an electron gun was used, crucibles for a metal and for an organic polymer were set, and the metal and the organic polymer were simultaneously deposited. As a metal vapor source, Co-15 wt. % Ni was used. As a deposition base, a polyimide film was used, and each film having a thickness of 1,000 Å was formed under a pressure of $1 \times 10^{-5}$ Torr.

iv) The Vacuum Deposition Process (of the Resistance Heating Type):

Each film was formed using the same conditions as those under iii), except that vaporization was carried out using the resistance heating process.

Measurement of the Amount of Co-deposited Organic Polymers

Using a carbon-in-metal analyzing apparatus (EMIA-110 manufactured by Horiba Ltd.), each sample was heated to 1,000° to 1,350° C., and the amount of the co-deposited organic polymer was measured quantitatively by determining $CO_2$ and CO released, or by using the UV absorption technique, or the fluorescent X-ray technique (a 3371 model manufactured by Rigakudenki: an analyzing crystal).

Analysis of the Metal Compositions

Analysis was carried out by the ICP process (a high-frequency plasma analysis process; an ICAP-575 model manufactured by Nippon Jarrell Ash Industries, Inc) or the fluorescent X-ray technique mentioned above.

Analysis of the Film Thicknesses

Each film was cut to form a ultrathin cut piece having the transversal section of the film, and the thickness of the film was measured by a TEM (a transmission type electron microscope; 2000FX manufactured by Nihon Denshi Kabushiki-kaisha). Conversion was performed by taking the amount of the co-deposited organic polymer into consideration from the total amount of the metals found by the ICP process.

Measurement of magnetic characteristics

The coercive force (Hc), squareness ratio (Rs), saturation, and residual magnetic flux densities (Br and Bs) were measured with a VSM (vibrating sample magnetometer).

Corrosion resistance test

A shelf test was continuously conducted for 2 weeks in an environment of a temperature of 60° C. and a humidity of 90%, and the degree of lowering in the saturation magnetic flux density, $$R[R = \frac{B_s}{B_{S0}} \times 100,$$

wherein $B_s$ is the saturation magnetic flux density immediately after deposition and $B_{so}$ is one after the test}, caused between the state before test and the one after the test was determined with a VSM.

The corrosion resistance was graded based on the value of R as follows.
A: an R value of less than 2%
B: an R value of less than 4%
C: an R value of less than 8%
D: an R value of less than 16%
E: an R value of at least 16%

TABLE 1

| No. | Compound | Mol. wt. (MW) | Polar group density (per 500 of mol. wt.) |
|---|---|---|---|
| 1 | sodium salt of sulfonated novolak resin | ca 1,200 | sulfone gp. 3.8 |
| 2 | sodium salt of m-cresolmethylenesulfonic acid-formalin condensate | ca 1,500 | sulfone gp. 3 |
| 3 | condensate of formalin with sodium m-cresol-bakelite-methylenesulfonate and Schaeffer's acid | ca 3,000 | sulfone gp. 2 |
| 4 | condensate of formalin with sodium dihydroxy-naphthalenesulfonate | ca 3,000 | sulfone gp. 1.8 |
| 5 | sodium salt of sulfonated polytannic acid | ca 20,000 | sulfone gp. 2 |
| 6 | condensate of formalin with sodium phenyl phenoldisulfonate | ca 6,000 | sulfone gp. 3.4 |
| 7 | condensate of formalin with sodium naphtholsulfonate and phenolsulfonic acid | ca 2,800 | sulfone gp. 2.2 |
| 8 | condensate of formalin with phenanthrene and sodium phenolsulfonate | ca 3,200 | sulfone gp. 1.3 |
| 9 | sodium salt of sulfonated poly-p-hydroxyvinylpyridine | ca 20,000 | sulfone gp. 2 |
| 10 | ammonium sulfonate of nitrohumic acid | ca 10,000 | sulfone gp. 1.2 carboxyl gp. 1 |
| 11 | sodium ligninsulfonate (1) | ca 10,000 | sulfone gp. 1.1 |
| 12 | sodium ligninsulfonate (2) | ca 3,600 | sulfone gp. 1.3 |
| 13 | Cr chelate of sodium ligninsulfonate | ca 5,000 | sulfone gp. 1.3 |
| 14 | ammonium ligninsulfonate | ca 2,000 | sulfone gp. 1.4 |
| 15 | aminomethylated novolak resin | ca 1,400 | amino gp. 3.8 |
| 16 | aminomethylated condensate of formalin with naphthol | ca 2,500 | amino gp. 3.4 |
| 17 | aminomethylated condensate of formalin with phenanthrene and phenol | ca 3,000 | amino gp. 2.0 |
| 18 | sodium salt of sulfonated condensate of formalin with phenylphosphonic acid and phenol | ca 3,000 | sulfone gp. 3.0 phosphate gp. 1.0 |
| 19 | aminomethylated condensate of formalin with sodium naphtholsulfonate | ca 3,500 | sulfone gp. 1.6 amino gp. 1.3 |
| 20 | condensate of formalin with naphthol and phenolsulfonic acid | ca 3,000 | sulfone gp. 0.3 |
| 21 | ammonium sulfonate of nitrohumic acid | ca 9,000 | sulfone gp. 0.1 carboxyl gp. 0.6 |
| 22 | sodium ligninsulfonate (3) | ca 3,600 | sulfone gp. 0.3 |
| 23 | aminomethylated condensate of formalin with naphthol | ca 2,500 | amino gp. 0.2 |

| No. | Structure of hydroxystyrene polymer | wt.-av. mol. wt. (MW) |
|---|---|---|

TABLE 1-continued
| 24 | 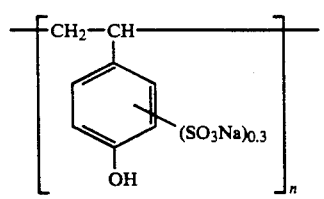 | 2,380 |
| --- | --- | --- |
| 25 | 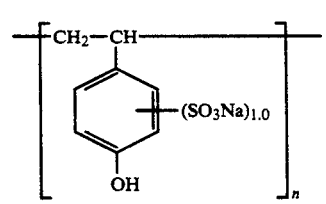 | 7,900 |
| 26 | 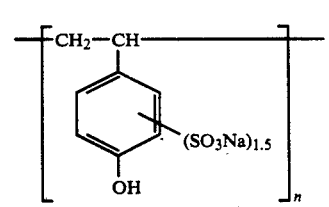 | 15,300 |
| 27 | 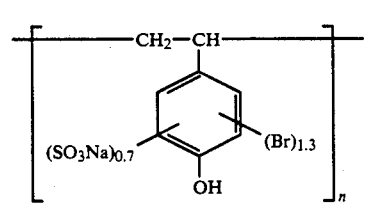 | 11,900 |
| 28 | 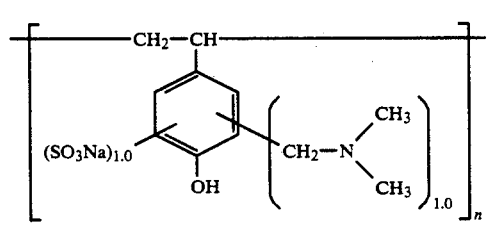 | 4,450 |
| 29 | 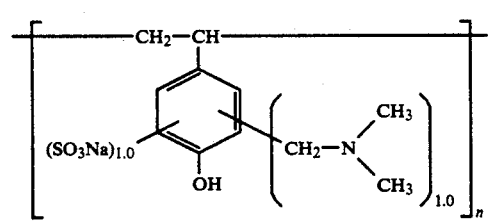 | 23,880 |
| 30 | 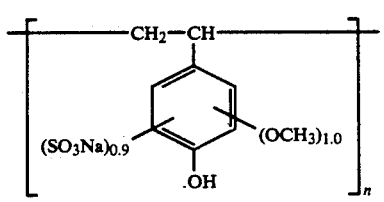 | 3,860 |

TABLE 1-continued

| # | Structure | Value |
|---|---|---|
| 31 | [−CH₂−C(CH₃)H−Ar(SO₃Na)₀.₉(OH)−(CH₂−P(=O)(OC₂H₅)₂)₀.₂−]ₙ | 4,070 |
| 32 | [−CH₂−CH−Ar(SO₃Na)₀.₈(OH)−(CH₂−P(=O)(CH₂)(CH₂))−]ₙ | 3,490 |
| 33 | [−CH₂−CH−Ar(SO₃Na)₁(OH)−(P(=O)(OC₂H₅)(OC₂H₅))₀.₁−]ₙ | 2,600 |
| 34 | [−CH₂−CH−Ar(SO₃Na)₁−C(CH₃)₃(OH)−]ₙ | 2,400 |
| 35 | [−CH₂−CH−Ar(SO₃Na)₀.₈(OH)−C(CH₃)(C₆H₅)−]ₙ | 17,000 |
| 36 | [−CH₂−CH−Ar(SO₃Na)₀.₁−C(CH₃)₃(OH)−]ₙ | 3,200 |
| 37 | [−CH₂−CH−Ar(SO₃Na)₀.₂(OH)−C(CH₃)(C₆H₅)−]ₙ | 8,800 |

TABLE 1-continued

| 38 | structure: poly[vinyl phenol with $CH_2N(CH_3)_2$ substituent ($\times 2$)], neutralized with acetic acid | 20,060 |
| --- | --- | --- |
| 39 | structure: poly[vinyl phenol with $CH_2N(CH_2CH_3)_2$ substituent, subscript 1.0], neutralized with acetic acid | 2,810 |
| 40 | structure: copolymer of vinyl phenol (with $(SO_3Na)_{0.1}$) and acrylic acid ($COOH$), ratio 1 : 0.3 | 11,000 |
| 41 | structure: copolymer of 4-hydroxystyrene and maleic acid-type unit $(CH-CH)_{0.3}$ with two COOH groups | 25,000 |
| 42 | structure: copolymer of 4-hydroxystyrene and $(CH-CH)_{0.4}$ with two COOH groups | 3,740 |
| 43 | structure: terpolymer — $[CH_2-CH(Ar)]$ with $(SO_3Na)_{0.2}$, OH, and $CH_2N(CH_2CH_2OH)_2$ (0.1), with $[CH_2-CH(COOH)]$ unit | 37,500 |
| 44 | structure: copolymer — vinyl phenol with $N(CH_3)_2CH_2$ substituent (0.3), and $(CH_2-C(CH_3)(C(=O)O-CH_2CH_2OH))_{0.5}$ | 4,210 |

TABLE 1-continued

| # | Structure | Value |
|---|---|---|
| 45 | $\left[-CH_2-CH-(CH_2-\underset{\underset{O-CH_3}{\overset{C=O}{|}}}{\overset{CH_3}{\underset{|}{C}}})_{0.6}\right]_n$ with phenyl bearing $(SO_3Na)_{1.2}$ and $OH$ | 2,760 |
| 46 | $\left[-CH_2-CH-(CH_2-CH)-\right]_n$ with one phenyl bearing $(NCH_2(CH_3)_2)_{1.5}$ and $OH$, other phenyl bearing $OCH_2CH_2OH$ | 6,210 |
| 47 | $\left[-CH_2-CH-(CH_2-CH)-\right]_n$ with one phenyl bearing $(SO_3Na)_{1.3}$ and $OH$, other phenyl unsubstituted | 23,600 |
| 48 | $\left[-CH_2-CH-(CH-CH)-\right]_n$ with phenyl bearing $(SO_3Na)_{1.0}$ and $OH$; maleimide with N-phenyl | 14,500 |
| 49 | $\left[-CH_2-\underset{\underset{phenyl}{|}}{\overset{CH_3}{\underset{|}{C}}}-(CH_2-\underset{COOH}{CH})_{0.2}-(CH_2-P(=O)(OC_2H_5)_2)_{0.2}\right]_n$ with phenyl bearing $OH$ | 8,800 |
| 50 | $\left[-CH_2-CH-(CH_2-\underset{\underset{COOH}{|}}{\overset{CH_3}{\underset{|}{C}}})_{0.3}-(CH_2-P(=O)(CH_3)_2)_{0.2}\right]_n$ with phenyl bearing $OH$ | 7,650 |
| 51 | $\left[-CH_2-CH-(CH_2-CH)_{0.6}-\right]_n$ with one phenyl bearing $(SO_3Na)_{0.5}$ and $OH$, other phenyl unsubstituted | 13,500 |

TABLE 1-continued

| 52 | [structure: copolymer with -CH₂-CH-(CH₂-CH)₀.₁ with COOH, phenol-OH, and -NCH₂-N(CH₃)₂ substituent at 1.0] | 4,500 |

| 53 | [structure: copolymer -CH₂-CH-(CH₂-C(CH₃))₀.₃ with C(=O)-O-CH₃ and phenol bearing (SO₃Na)₀.₆ and OH] | 6,700 |

| | compound | molecular weight |
|---|---|---|
| 54 | poly-p-hydroxy-vinylpyridine | 20,000 |
| 55 | formalin condensate of dihydroxynaphthalene | 2,500 |
| 56 | [-Si(CH₃)₂-C₆H₄-]ₙ | 2,000 |
| 57 | [-C₆H₄-Si(C₆H₅)₂-C₆H₄-C(=N-N=)O(oxadiazole)-]ₙ | |
| 58 | [-Si(R)(CH₃)-Si(R)(C₆H₅)-Si(R)(CH₃)-Si(R)(C₆H₅)-]ₙ | 55,000 |
| 59 | [-(P(CH₃)₃)₂-Ni-C≡C-C₆H₄-C≡C-]ₙ | |
| 60 | [-CH₂-CH(C₆H₄-Sn(CH₃)₃)-]ₙ | |

TABLE 1-continued

61

$\text{+CH-CH}_2\text{+}_n$ attached to phenyl ring; phenyl ring bonded to $Bu_3P-Pb(Br)-PBu_3$ Bu: butyl 10,000

62

$\text{+CH-CH}_2\text{+}_n$ attached to pyridine ring (4-position); N of pyridine bonded to PtCN

TABLE 2

| Symbol | Compound | wt.-av. mol. wt. ($\overline{MW}$) | polar group density (per 500 of mol. wt.) |
|---|---|---|---|
| Ra | polyethylene glycol | ca 1,700 | |
| Rb | sodium ligninsulfonate | ca 700 | sulfone group 0.2 |
| Rc | gelatin | ca 60,000 | |
| Rd | polyethylene | ca 100,000 | |
| Re | polypropylene | ca 200,000 | |

TABLE 3

| Plating bath | Symbol | Bath composition | |
|---|---|---|---|
| Co—P | A | cobalt acetate (Co(CH$_3$COO)$_2$.4H$_2$O) | 0.05 mol/l |
| | | Rochelle salt (KNaC$_4$H$_4$O$_6$.4H$_2$O) | 0.5 mol/l |
| | | ammonium acetate (CH$_3$COONH$_4$) | 0.5 mol/l |
| | | sodium hypophosphite (NaH$_2$PO$_2$.H$_2$O) | 0.2 mol/l |
| | | pH (ammonia liq.) 9.5~9.8 | |
| | | bath temp. 60~70° C. | |
| Co—P | B | cobalt chloride (CoCl$_2$.6H$_2$O) | 0.05 mol/l |
| | | sodium tartrate (NaC$_2$H$_4$O$_6$.2H$_2$O) | 0.5 mol/l |
| | | ammonium chloride (NH$_4$Cl) | 0.15 mol/l |
| | | sodium hypophosphite (NaH$_2$PO$_2$.H$_2$O) | 0.5 mol/l |
| | | pH (ammonia liq.) 9.5~9.8 | |
| | | bath temp. 75~85° C. | |
| Co—Ni—P | C | cobalt sulfate (CoSO$_4$.7H$_2$O) | 0.06 mol/l |
| | | nickel sulfate (NiSO$_4$.6H$_2$O) | 0.04 mol/l |
| | | sodium citrate (Na$_3$C$_6$H$_5$O$_7$.2H$_2$O) | 0.3 mol/l |
| | | citric acid (C$_6$H$_8$O$_7$) | 0.25 mol/l |
| | | ammonium sulfate ((NH$_4$)$_2$SO$_4$) | 0.3 mol/l |
| | | sodium hypophosphite (NaH$_2$PO$_2$.H$_2$O) | 0.2 mol/l |
| | | pH (ammonia liq.) 8~8.5 | |
| | | bath temp. 75~85° C. | |
| Co—Mn—P | D | cobalt sulfate (CoSO$_4$.7H$_2$O) | 0.06 mol/l |
| | | nickel sulfate (NiSO$_4$.6H$_2$O) | 0.04 mol/l |
| | | manganese sulfate (MnSO$_4$) | 0.03 mol/l |
| | | sodium tartrate (Na$_2$C$_4$H$_4$O$_6$) | 0.5 mol/l |
| | | ammonium sulfate ((NH$_4$)$_2$SO$_4$) | 0.5 mol/l |
| | | sodium hypophosphite (NaH$_2$PO$_2$.H$_2$O) | 0.2 mol/l |
| | | pH 9.0~9.4 | |
| | | bath temp. 75~85° C. | |
| Co—Ni—Re—P | E | cobalt sulfate (CoSO$_4$.7H$_2$O) | 0.06 mol/l |
| | | nickel sulfate (NiSO$_4$.6H$_2$O) | 0.04 mol/l |
| | | ammonium perrhenate (NH$_4$ReO$_4$) | 0.007 mol/l |
| | | ammonium sulfate ((NH$_4$)$_2$SO$_4$) | 0.5 mol/l |
| | | sodium tartrate (Na$_2$C$_4$H$_4$O$_6$) | 0.5 mol/l |
| | | sodium hypophosphite (NaH$_2$PO$_2$.H$_2$O) | 0.2 mol/l |
| | | pH 8.5~9.5 | |
| | | bath temp. 75~80° C. | |

TABLE 4

| | No. | Plating bath | Cpd. No. | Amount (g/l) | Plating base material | Corrosion resistance |
|---|---|---|---|---|---|---|
| Product of present invention | 1 | A | 1 | 0.05 | PET | C |
| | 2 | " | 4 | 0.1 | " | A |
| | 3 | " | 7 | 0.2 | " | A |
| | 4 | " | 10 | 1 | " | A |
| | 5 | " | 13 | 2 | " | B |
| | 6 | " | 16 | 0.2 | " | B |
| | 7 | " | 19 | " | " | A |
| | 8 | " | 22 | " | " | A |
| | 9 | " | 25 | 10 | " | A |
| | 10 | " | 28 | 0.5 | " | A |
| | 11 | " | 31 | " | " | A |
| | 12 | " | 34 | " | " | B |
| | 13 | " | 37 | " | " | A |
| | 14 | " | 40 | " | " | B |
| | 15 | " | 43 | " | " | A |
| | 16 | A | 46 | " | PET (Lumirror) | B |
| | 17 | " | 49 | " | " | B |
| | 18 | " | 52 | " | " | B |
| | 19 | B | 2 | 0.05 | PET | C |
| | 20 | " | 5 | 0.1 | " | A |
| | 21 | " | 8 | 0.2 | " | A |
| | 22 | " | 11 | 1 | " | A |
| | 23 | " | 14 | 2 | " | B |
| | 24 | " | 17 | 20 | " | A |
| | 25 | " | 20 | 2 | " | B |
| | 26 | " | 23 | 5 | " | B |
| | 27 | " | 26 | 0.2 | " | A |
| | 28 | " | 29 | 0.5 | " | A |
| | 29 | " | 32 | 0.2 | " | A |
| | 30 | " | 35 | 1 | " | A |
| | 31 | B | 38 | 0.2 | PET | B |
| | 32 | " | 41 | 0.5 | " | B |
| | 33 | " | 44 | 0.5 | " | A |
| | 34 | " | 47 | 0.5 | PET (Lumirror) | A |
| | 35 | " | 50 | 0.2 | " | A |
| | 36 | " | 53 | 2 | " | A |
| | 37 | C | 3 | 0.05 | PET film | C |
| | 38 | " | 6 | 0.1 | " | B |
| | 39 | " | 9 | 0.2 | " | A |
| | 40 | " | 12 | 1 | " | A |
| | 41 | " | 15 | 0.5 | " | B |
| | 42 | " | 18 | 0.2 | " | A |
| | 43 | " | 21 | 0.5 | " | A |
| | 44 | " | 24 | 10 | " | B |
| | 45 | " | 27 | 2 | " | A |
| | 46 | C | 30 | 1 | PET film | A |
| | 47 | " | 33 | 0.5 | " | A |
| | 48 | " | 34 | 0.2 | " | A |
| | 49 | " | 37 | 0.5 | " | A |
| | 50 | " | 40 | 1 | " | B |
| | 51 | " | 43 | 0.5 | PET (Lumirror) | A |
| | 52 | " | 46 | 0.2 | " | B |
| | 53 | " | 49 | 1 | " | B |
| | 54 | D | 6 | 0.2 | PET film | A |
| | 55 | " | 26 | 0.5 | " | A |
| | 56 | " | 29 | 0.5 | " | A |
| | 57 | " | 33 | 0.5 | " | A |
| | 58 | " | 43 | 2 | " | A |
| | 59 | E | 10 | 0.2 | PET film | A |
| | 60 | " | 27 | 0.5 | " | A |
| | 61 | E | 28 | 0.5 | PET film | A |
| | 62 | " | 31 | 0.5 | " | A |
| | 63 | " | 48 | 2 | " | A |
| Comparative product | 64 | A | — | — | PET film | D |
| | 65 | B | — | — | " | D |
| | 66 | C | — | — | " | D |
| | 67 | D | — | — | " | D |
| | 68 | E | — | — | " | D |
| | 69 | A | 6 | 0.001 | " | D |
| | 70 | A | Ra | 2 | " | E |
| | 71 | C | Rb | 2 | " | E |
| | 72 | C | Rc | 2 | " | E |

TABLE 5

| No. | Physical deposition process | Metal target | Polymer used No. | Base for deposition | Amount of co-deposited polymer (wt. %) | Corrosion resistance |
|---|---|---|---|---|---|---|
| According to the present invention | | | | | | |
| 73 | Magnetron sputtering process | Co—Ni | 4 | Glass | | B |
| 74 | " | " | 7 | " | | B |
| 75 | " | " | 25 | " | 0.01 | B |
| 76 | " | " | 25 | " | 0.2 | A |
| 77 | " | " | 25 | " | 1.3 | A |
| 78 | " | " | 25 | " | 4.7 | B |
| 79 | " | " | 29 | " | | A |
| 80 | " | " | 31 | " | | A |
| 81 | " | " | 37 | " | | A |
| 82 | " | " | 39 | " | | A |
| 83 | " | " | 41 | " | | A |
| 84 | " | " | 43 | " | | A |
| 85 | " | " | 46 | " | | A |
| 86 | " | " | 48 | " | | A |
| 87 | " | " | 54 | " | | B |
| 88 | " | " | 55 | " | | A |
| 89 | " | " | 56 | " | | B |
| 90 | " | " | 57 | " | | A |
| 91 | " | " | 58 | " | | A |
| 92 | " | " | 59 | " | | B |
| 93 | Magnetron sputtering process | Co—Ni | 60 | Glass | | A |
| 94 | " | " | 61 | " | | A |
| 95 | " | " | 62 | " | | A |
| 96 | Opposed target type sputtering process | " | 25 | " | | A |
| 97 | Opposed target type sputtering process | " | 29 | " | | A |
| 98 | Opposed target type sputtering process | " | 61 | " | | A |
| 99 | Opposed target type sputtering process | " | 62 | " | | A |
| 100 | Electron beam heating type vacuum deposition process | " | 25 | Polyimide film | | B |
| 101 | Electron beam heating type vacuum deposition process | " | 29 | " | | B |
| 102 | Electron beam heating type vacuum deposition process | " | 61 | " | | B |
| 103 | Electron beam heating type vacuum deposition process | " | 62 | " | | A |
| 104 | Magnetron sputtering process | Co—Ni | — | Glass | | E |
| 105 | Opposed target type sputtering process | " | — | " | | E |
| 106 | Electron beam heating type vacuum deposition process | " | — | Polyimide film | | E |
| 107 | Electron beam heating type vacuum deposition process | " | Rd | " | 1.3 | E |
| 108 | Electron beam heating type vacuum deposition process | " | Re | " | 1.1 | E |
| 109 | Resistance heating type vacuum deposition process | " | Rd | " | 1.7 | E |
| 110 | Resistance heating type vacuum deposition process | " | Re | " | 1.3 | E |

The corrosion resistance of the magnetic plated coatings prepared by the electroless plating process according to the present invention is shown in Table 4 in comparison with the corrosion resistance of the comparative products. Hc shows a coercive force and Rs shows a squareness ratio.

The magnetic characteristics of the magnetic plating coatings of Ex. Nos. 1 to 36 wherein plating baths A and B were used as a base bath were Hc of 700 to 1200 Oe and Rs of 0.6 to 0.8. The magnetic characteristics of the magnetic plating coatings of Ex. Nos. 54 to 58 wherein plating bath D was used were Hc of 500 to 900 Oe and Rs of 0.65 to 0.75. The magnetic characteristics of the magnetic plating coatings of Ex. Nos. 59 to 63 wherein plating bath E was used were Hc of 700 to 1100 Oe and Rs of 0.6 to 0.8.

The results of the corrosion resistance substantiate that the corrosion resistance of product Nos. 1 to 63 of the present invention is remarkably superior to that of the comparative product Nos. 64 to 72.

It is apparent that the magnetic coatings (Nos. 70 to 72) prepared by making use of baths each containing a water-soluble organic polymer not meeting the requirements of the present invention have lowered corrosion resistance.

Table 5 shows the corrosion resistance of the magnetic films obtained by the physical vapor deposition method according to the present invention and the conversion resistance of the comparative products.

The magnetic films Nos. 73 to 103 according to the present invention showed such magnetic properties that Hc = 500 to 1,000 Oe, and Rs = 0.6 to 0.8, which were almost the same as those of the comparative magnetic films Nos. 104 to 107 wherein Hc = 500 to 1,100 Oe, and Rs = 0.6 to 0.8. Remarkable lowering of the magnetic properties due to the presence of the organic polymers that were made into composites was not observed.

The test results of the corrosion resistance show that the corrosion resistance of the magnetic film Nos. 73 to 103 according to the present invention is more excellent than that of the comparative magnetic film Nos. 104 to 109.

The Hc of the magnetic films (Nos. 106 to 109) wherein common organic polymers were made into composites that did not meet the conditions of the present invention was 50 to 100 Oe, which was remarkably low. From Table 5, it can be understood that corrosion resistance was not improved.

Similar results were obtained in the case of Fe-Co type, Fe-Ni type, and Co-Pt type magnetic films.

As seen in the description, both processes of the invention, the electroless plating and the physical vapor deposition, can provide a resulting recording medium with an unexpectedly improved resistance to corrosion.

We claim:

1. A process for preparing a magnetic recording medium which comprises a substrate and a recording layer coated on the substrate comprising:

immersing a substrate into an aqueous solution comprising a ferromagnetic metal ion, a reducing agent for the metal ion, a complexing agent for the metal ion, a pH buffer, an adjuster and 0.005 to 100 g per liter of an aromatic organic polymer (B') and co-depositing and continuously forming onto the substrate, a thin film of a ferromagnetic metal, and being contained in the film, 0.001 to 30 percent by weight, based on the film, of an aromatic organic polymer (B') having a weight-average molecular weight of 1,000 to 1,000,000 and comprising at least one aromatic ring and 1 to 10 hydroxyl groups (—OH) on the average based on 500 units of the molecular weight and further, as an indispensable component, 0.1 to 4 sulfone groups (—SO$_3$) or 0.1 to 6 groups on the average, based on 500 units of the molecular weight, of at least one polar group selected from the group consisting of a phosphate group represented by the formula

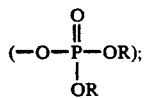

a phosphite group represented by the formula

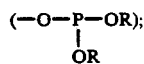

a phosphonate group represented by the formula

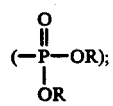

a phosphonite group represented by the formula

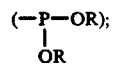

a phosphinate group represented by the formula

a phosphinite group represented by the formula

a tertiary amino group represented by the formula

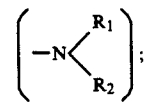

and a quaternary ammonium group represented by the formula

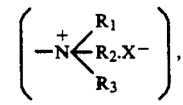

wherein R is a hydrogen atom or a hydrocarbon group, R$_1$, R$_2$, and R$_3$ which may be the same or different are each a straight-chain group, a branched alkyl group, a hydroxyalkyl group or an aromatic group, and X is a counter anion, a carboxyl group )—COOH), or a nitro group, wherein said aromatic rings are linked to each other through a main chain comprising at least one member selected from a C—C, C=C, or ether (C—O—C) bond.

2. The process as claimed in claim 1, in which R$_1$, R$_2$ and R$_3$ are each a phenyl group or a benzyl group.

3. The process as claimed in claim 1, in which the film contains 0.001 to 10 percent by weight of polymer (B').

4. The process as claimed in claim 1, in which the film contains 0.001 to 10 percent by weight of polymer (B').

5. The process as claimed in claim 1, in which polymer (B') is contained in the crystal grain of the metal.

6. The process as claimed in claim 1, in which polymer (B') is soluble or dispersible in water.

7. The process as claimed in claim 1, in which a metal is contained in the molecule of polymer (B').

8. The process as claimed in claim 7, in which the metal is selected from the group consisting of Co, Ni, Ti, Pd, Pt, Zr, Hf, Rh, Fe, V, Cr, Mo and Si.

9. The process as claimed in claim 1, in which at least one of said hydroxy group is attached to at least one of said aromatic ring.

10. The process as claimed in claim 1, which is conducted while controlling proportions of polymer (B') to the entire codeposited thin film in a range of 0.01 to 30 percent by weight, to affect an electroless plating.

11. A process for preparing a magnetic recording medium which comprises a substrate and a recording layer coated on the substrate comprising:

co-depositing and continuously forming by evaporation onto the substrate, a thin film of a ferromagnetic metal and being contained in the film, 0.001 to 10 percent by weight, based on the film of an aromatic organic polymer (B') having a weight-average molecular weight of 1,000 to 1,000,000 and comprising at least one aromatic ring and 1 to 10 hydroxyl groups (—OH) on the average based on 500 units of the molecular weight and further, as an indispensable component, 0.1 to 4 sulfone groups (—SO$_3$) or 0.1 to 6 groups on the average, based on 500 units of the molecular weight, of at least one polar group selected from the group consisting of a phosphate group represented by the formula

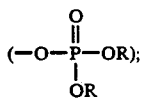

a phosphite group represented by the formula

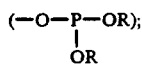

a phosphonate group represented by the formula

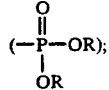

a phosphonite group represented by the formula

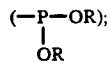

a phosphinate group represented by the formula

a phosphinite group represented by the formula

a tertiary amino group represented by the formula

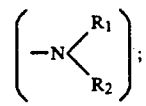

and a quaternary ammonium group represented by the formula

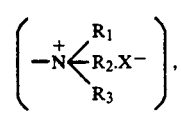

wherein R is a hydrogen atom or a hydrocarbon group, $R_1$, $R_2$, and $R_3$ which may be the same or different are each a straight-chain group, a branched alkyl group, a hydroxyalkyl group or an aromatic group, and X is a counter anion, a carboxyl group (—COOH), or a nitro group, wherein said aromatic rings are linked to each other through a main chain comprising at least one member selected from a C—C, C=C, or ether (C—O—C) bond.

12. The process as claimed in claim 11, which is conducted while controlling proportions of polymer (B') to the entire co-deposited thin film in a range of 0.01 to 30 percent by weight.

13. A process for preparing a magnetic recording medium which comprises a substrate and a recording layer coated on the substrate comprising:

co-depositing and continuously forming by evaporation onto the substrate, a thin film of a ferromagnetic metal and being contained in the film 0.001 to 10 percent by weight, based on the film, of an aromatic organic polymer (A) defined by formula (A):

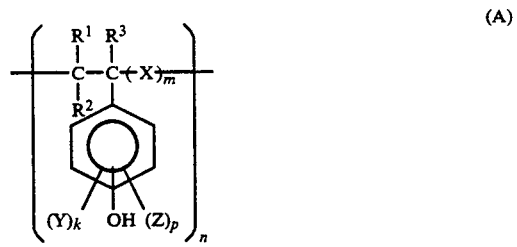

wherein m≧0 and n≧3 and each is an arbitrary number necessary for said organic aromatic polymer defined by formula (A) to have a weight-average molecular weight up to 1,000,000;

0≧k≧2;

0≧p≧2;

provided that k+p+m≧0;

$R^1$, $R^2$, and $R^3$ are each H or an alkyl group having 1 to 5 carbon atoms;

X is a polymerizable vinyl monomer; and

Y and Z which may be the same or different are each selected from the group consisting of

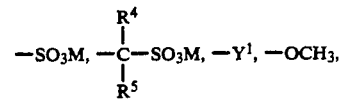

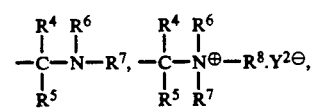

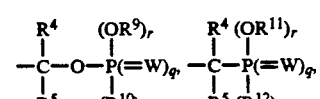

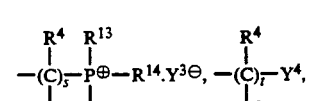

$CR^4R^5OR^6$, —$CH_2OH$, an alkyl group having 1 to 18 carbon atoms and an aryl group, wherein M is H, an alkali metal, an alkaline earth metal, or an organic cation of an amine;

$Y^1$ and $Y^4$ are each a halogen;

$Y^2$ and $Y^3$ are each a counter ion selected from a halogen ion, an organic acid anion, or an inorganic acid anion;

W is S or O;

$R^4$ to $R^8$ which may be the same or different are each a straight-chain group, a branched alkyl group, a hydroxyalkyl group, an aromatic group, or H, provided that $R^6$ $R^7$ may be combined to form a ring together with the N group;

$R^9$ to $R^{15}$ which may be the same or different are each a straight-chain group, a branched alkyl group, a hydroxyalkyl group, an aromatic group, or H;

q, s, and t are each 0 or 1; and r is 0, 1, or 2.

14. The process as claimed in claim 13, which is conducted while controlling proportions of polymer (A) to the entire co-deposited thin film in a range of 0.01 to 30 percent by weight.

15. A process for preparing a magnetic recording medium which comprises a substrate and a recording layer coated on the substrate comprising:

immersing a substrate into an aqueous solution comprising a ferromagnetic metal ion, a reducing agent for the metal ion, a complexing agent for the metal ion, a pH buffer, an adjuster and 0.005 to 100 g per liter of an aromatic organic polymer (A) and co-depositing and continuously forming onto the substrate, a thin film of a ferromagnetic metal, and being contained in the film, 0.001 to 30 percent by weight, based on the film, of an aromatic organic polymer (A) defined by formula (A):

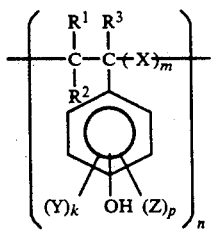 (A)

wherein $m \geq 0$ and $n \geq 3$ and each is an arbitrary number necessary for said organic aromatic polymer defined by formula (A) to have a weight-average molecular weight up to 1,000,000;

$0 \leq k \leq 2$;

$0 \leq p \leq 2$;

provided that $k+p+x \geq 0$;

$R^1$, $R^2$, and $R^3$ are each H or an alkyl group having 1 to 5 carbon atoms;

x is a polymerizable vinyl monomer; and

Y and Z which may be the same or different are each selected from the group consisting of

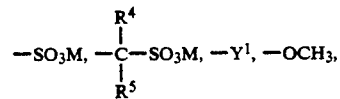

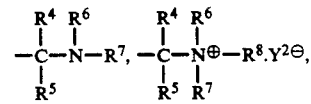

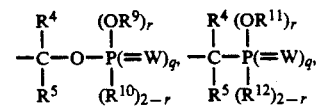

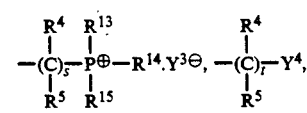

$CR^4R^5OR^6$, —$CH_2OH$, an alkyl group having 1 to 18 carbon atoms and an aryl group, wherein M is H, an alkali metal, an alkaline earth metal, or an organic cation of an amine;

$Y^1$ and $Y^4$ are each a halogen;

$Y^2$ and $Y^3$ are each a counter ion selected from a halogen ion, an organic acid anion, or an inorganic acid anion;

W is S or O;

$R^4$ to $R^8$ which may be the same or different are each a straight-chain group, a branched alkyl group, a hydroxyalkyl group, an aromatic group, or H, provided that $R^6$ and $R^7$ may be combined to form a ring together with the N group;

$R^9$ and $R^{15}$ which may be the same or different are each a straight-chain group, a branched alkyl group, a hydroxyalkyl group, an aromatic group, or H;

q, s, and t are each 0 or 1; and r is 0, 1, or 2.

16. The process as claimed in claim 15, which is conducted while controlling proportions of polymer (A) to the entire codeposited thin film in a range of 0.01 to 30 percent by weight, to affect an electroless plating.

* * * * *